(12) United States Patent
Yang et al.

(10) Patent No.: US 8,250,926 B2
(45) Date of Patent: Aug. 28, 2012

(54) FABRICATION METHOD OF A FLEXIBLE CAPACITIVE PRESSURE SENSOR

(75) Inventors: Yao-Joe Yang, Taipei (TW); Ming-Yuan Cheng, Kaohsiung County (TW); Xin-Hua Huang, Changhua County (TW)

(73) Assignee: National Taiwan University, Taipei (TW)

( * ) Notice: Subject to any disclaimer, the term of this patent is extended or adjusted under 35 U.S.C. 154(b) by 491 days.

(21) Appl. No.: 12/654,997

(22) Filed: Jan. 13, 2010

(65) Prior Publication Data

US 2011/0005325 A1    Jan. 13, 2011

(30) Foreign Application Priority Data

Jul. 13, 2009   (TW) ................................ 98123562 A

(51) Int. Cl.
*G01L 9/12* (2006.01)

(52) U.S. Cl. ............................. 73/724; 73/715; 73/729.2

(58) Field of Classification Search ........................ None
See application file for complete search history.

(56) References Cited

U.S. PATENT DOCUMENTS

| | | | |
|---|---|---|---|
| 6,167,761 B1 * | 1/2001 | Hanzawa et al. | 73/724 |
| 6,257,068 B1 * | 7/2001 | Briefer et al. | 73/718 |
| 6,370,960 B1 * | 4/2002 | Igel et al. | 73/724 |
| 6,639,578 B1 * | 10/2003 | Comiskey et al. | 345/107 |
| 6,644,117 B1 * | 11/2003 | Kueck et al. | 73/488 |
| 6,787,020 B2 * | 9/2004 | Kanaya et al. | 205/626 |
| 6,809,462 B2 * | 10/2004 | Pelrine et al. | 310/319 |
| 7,066,030 B2 * | 6/2006 | Jacob | 73/715 |
| 7,436,099 B2 * | 10/2008 | Pei et al. | 310/311 |
| 7,438,823 B2 * | 10/2008 | Nien et al. | 216/52 |
| 7,757,563 B2 * | 7/2010 | Grudzien | 73/716 |
| 7,784,366 B2 * | 8/2010 | Daverman et al. | 73/862.626 |

* cited by examiner

*Primary Examiner* — Lisa Caputo
*Assistant Examiner* — Jermaine Jenkins
(74) *Attorney, Agent, or Firm* — Bacon & Thomas, PLLC

(57) ABSTRACT

The invention relates to a capacitive pressure sensor and a method for fabricating thereof. The capacitive pressure sensor comprises a cover, a plurality of first electrode, a substrate and a plurality of second electrode. The cover owns an upper wall and a plurality of side walls. The plurality of first electrode is disposed on the inside of the upper wall of the cover. The side walls of the cover are connected to the substrate to form a space. The plurality of second electrode is disposed on the substrate. The plurality of first electrode and the plurality of second electrode are both in the space. In the invention, the material for cover, the plurality of first electrodes and the substrate are all flexible polymeric material.

19 Claims, 5 Drawing Sheets

FABRICATION METHOD OF A FLEXIBLE CAPACITIVE PRESSURE SENSOR

BACKGROUND OF THE INVENTION

1. Field of the Invention

The invention relates to a pressure sensor, particularly to the flexible capacitive pressure sensor based on novel capacitance mechanism.

2. Description of the Prior Art

As the robot sensing system is getting complicated day by day, the artificial skin of robot contacted with the surrounding environment shall own multiple sensing function, high resolution, and high sensitivity. Excepting the front normal stress, if the artificial skin can also sense the side shear stress, the article grasped by the robot hand may not be damaged and not be dropped. Therefore, the artificial skin used for sensing pressure will play a more important role in the future.

The capacitive pressure sensor owns many advantages, such as from owns the characteristics of acceptable sensitivity, low power consumption, long-term stability, and immune to temperature variation etc. It has already been generally applied to a lot of different fields, such as the industry, medicine, and biochemistry etc. At present, most capacitive pressure sensors have been fabricated by the silicon micromachining technology.

In general, silicon-based devices are too brittle to sustain large deformation. These silicon-based devices are also unsuitable to cover the curved surface with large area. Thus, the drawback of the traditional silicon-based capacitive pressure sensor is that its brittle silicon substrate is unsuitable for the application.

Thus, in order to respond the industrialized demand of artificial skin, it is still necessary to develop the relevant capacitive sensing technology in the future, so as to save the time and cost and achieve the purpose of improving the artificial skin technology.

SUMMARY OF THE INVENTION

The purpose of the invention is to provide a capacitive pressure sensor and a method for fabricating thereof in order to improve the drawback of the existing technology.

According to a feature of the invention, the capacitive pressure sensor provided by the invention comprises a cover, a plurality of first electrode, a substrate and a plurality of second electrode. The cover owns an upper wall and a plurality of side walls. The plurality of first electrode disposes on the inside of the upper wall of the cover. The side walls of the cover are connected to the substrate to form a space. The plurality of second electrode disposes on the substrate. The plurality of first and the plurality of second electrode are both in the space. One of a plurality of first electrode corresponds to at least one of the plurality of second electrode in order to form a plurality of sensing capacities. In the invention, the material of the cover, the plurality of first electrodes and the substrate are flexible polymeric materials.

According to another feature of the invention, the fabricating method for the capacitive pressure sensor provided by the invention comprises: providing a cover with an upper wall and a plurality of side walls; disposing a plurality of first electrode on the inside of the upper wall of the cover; disposing a plurality of second electrode on the substrate; and connecting a plurality of side walls of the cover and the substrate, so that one of the first electrode corresponds to at least one of the plurality of second electrode in order to form a plurality of sensing capacities. The material of the cover and the substrate are flexible polymeric materials.

The advantage of the invention is to provide a capacitive pressure sensor, which uses the polydimethylsiloxane and polyimide as the structural substrate. It is apt to produce the pressure sensor having larger capacity change and pressure sensing sensitivity. Moreover, in the invention, because of the design of structure, the sensor not only can sense the front normal stress, but also can sense the side shear stress.

Therefore, the advantage and spirit of the invention can be understood further by the following detail description of invention and attached Figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

As for the description for the preferred embodiments of the invention, please refer to FIG. 1, FIG. 2, FIG. 3, and FIG. 4.

Figure 1:
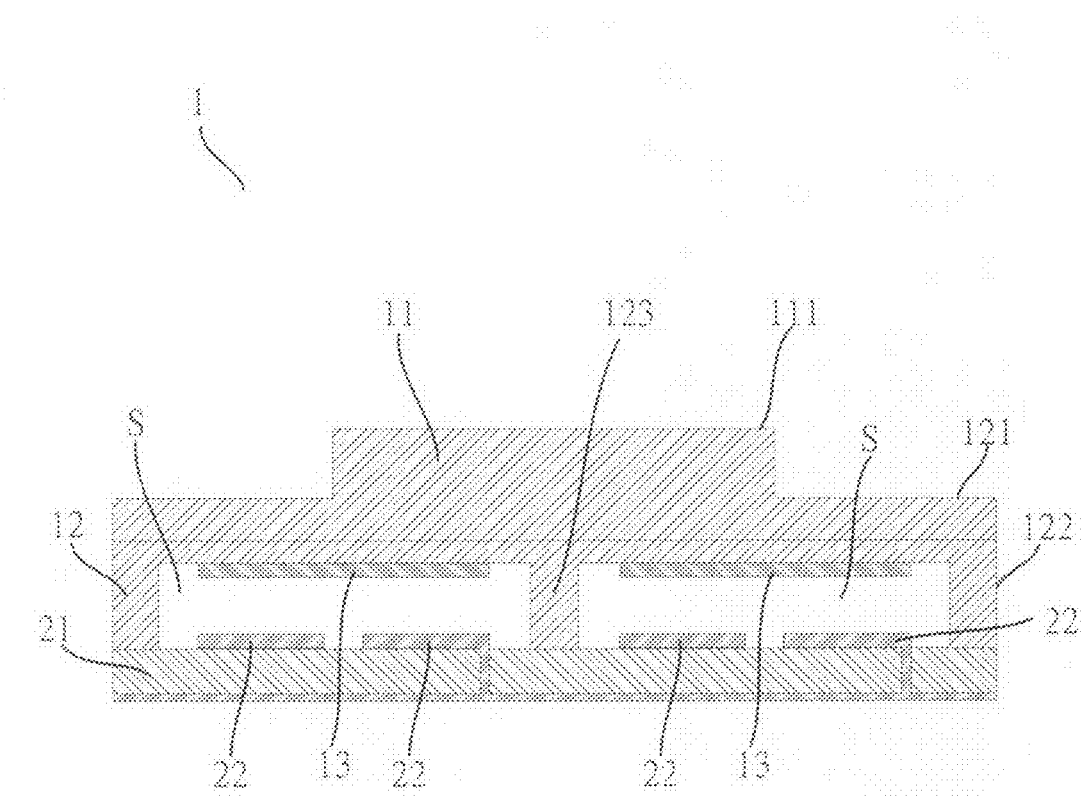
FIG. 1 schematically shows the structure of capacitive pressure sensor for a preferred embodiment of the invention.

FIG. 1 schematically shows the structure of capacitive pressure sensor for a preferred embodiment of the invention. The capacitive pressure sensor 1 provided by the embodiment comprises a stress layer 11, a cover 12, a plurality of first electrode 13, a substrate 21 and a plurality of second electrode 22, wherein the stress layer 11 has a convex part 111, the cover 12 has an upper wall 121 and a plurality of side walls 122.

In the embodiment, the upper wall 121 of the cover 12 connects the stress layer 11 to form a connection structure. In the other embodiment, the stress layer 11 and the cover 12 can also be formed in one piece. The side walls 122 of the cover 12 connect the substrate 21. In the embodiment, the adhering method and other common connecting method of microelectromechanical technology can be adopted for the above-mentioned connection. The convex part 111 of the stress layer 11 can help to sense the stressing condition of whole capacitive pressure sensor 1.

Figure 2:
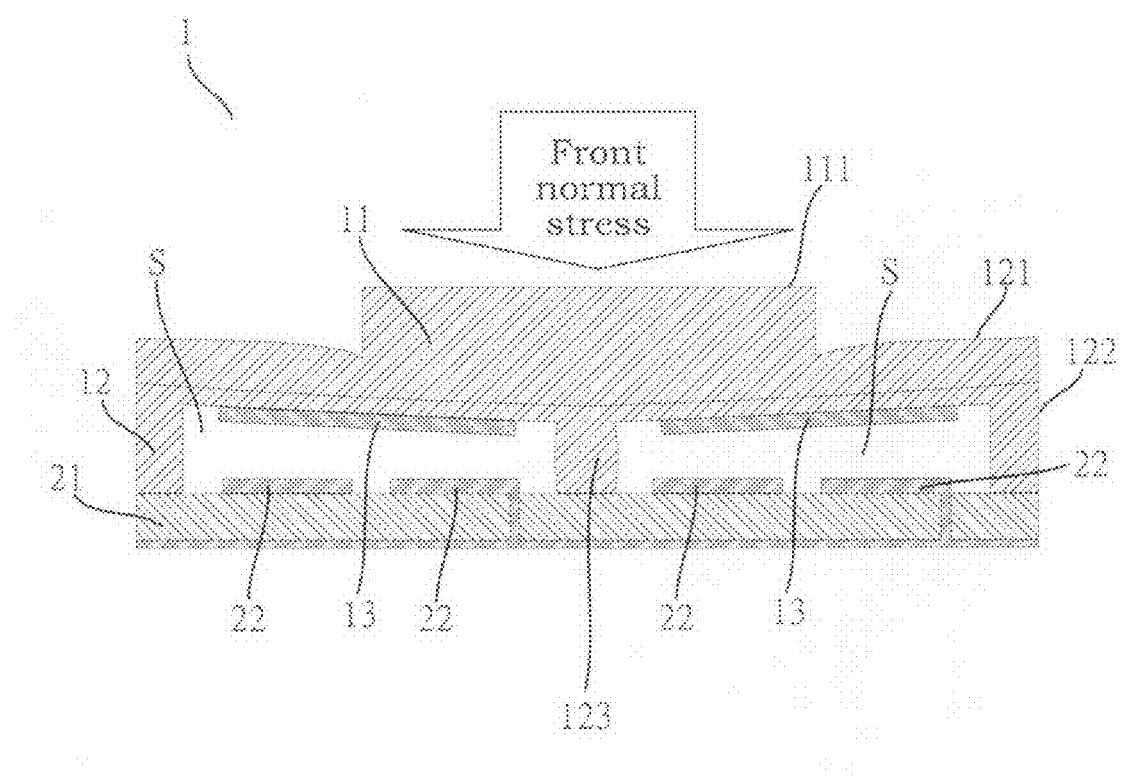
FIG. 2 schematically shows the front normal stress of capacitive pressure sensor for a preferred embodiment of the invention.

FIG. 2 schematically shows the front normal stress of capacitive pressure sensor for a preferred embodiment of the invention. The convex part 111 of the stress layer 11 can help the capacitive pressure sensor 1 to accept the front normal stress.

Figure 3:
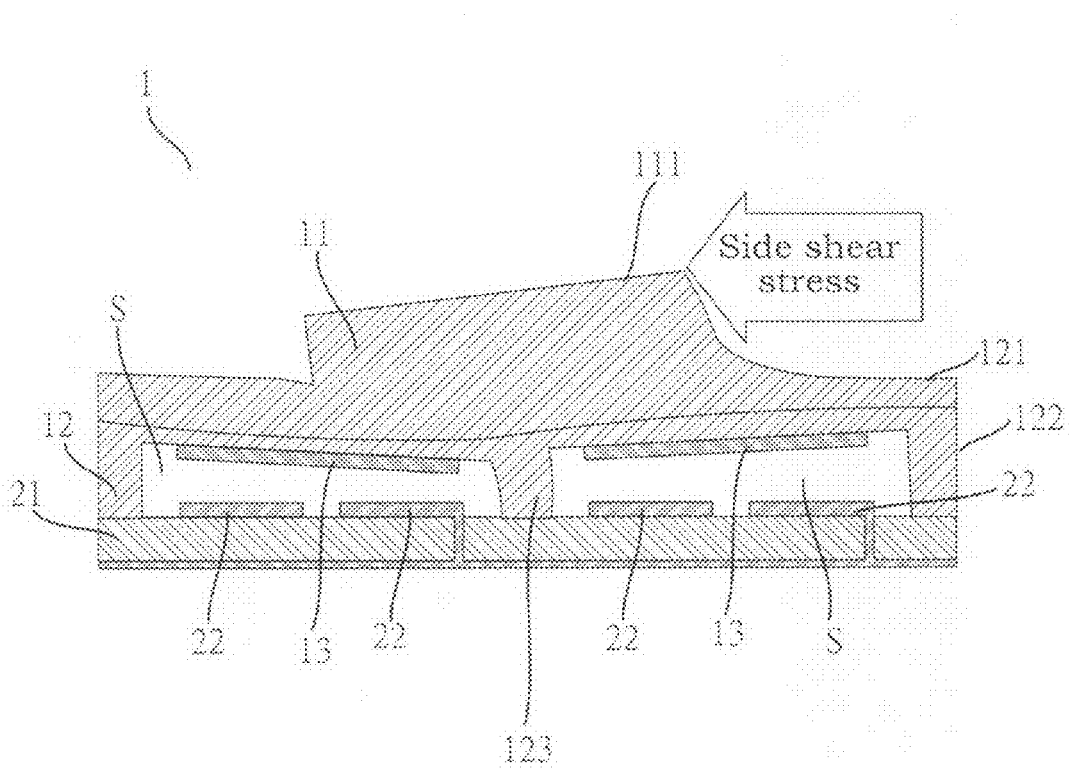
FIG. 3 schematically shows the side shear stress of capacitive pressure sensor for a preferred embodiment of the invention.

FIG. 3 schematically shows the side shear stress of capacitive pressure sensor for a preferred embodiment of the invention. The convex part 111 of the stress layer 11 can help the capacitive pressure sensor 1 to accept the side shear stress. In the embodiment, the stress layer 11 and the convex part 111 are formed in one piece. In the other embodiment, the stress layer 11 and the convex part 111 can also be formed separately, and then connected together.

In the embodiment, the material of the stress layer 11, the cover 12, a plurality of first electrode 13, and the substrate 21 are flexible polymeric materials. The preferred material of the stress layer 11 and the cover 12 is polydimethyl siloxane (PDMS). The preferred material of the substrate 21 is polyimide.

In the embodiment, the side walls 122 of the cover 12 connect the substrate 21 to form a closed space S. In the other embodiment, the cover 12 has a support pillar 123, which connects the substrate 21, and divides the space S into a first space and a second space. In addition, the support pillar 123 is formed by the inside of the upper wall 121, and the preferred position is the middle of the upper wall 121. Therefore, as shown in FIG. 2 and FIG. 3, the support pillar 123 can support the upper wall 121 of the cover 12, in order to help measuring the front normal stress or the side shear stress.

A plurality of first electrode 13 disposes on the inside of the upper wall 121 of the cover 12. A plurality of second electrode 22 disposes on the substrate 21. The first plurality of electrode 13 and the plurality of second electrode 22 are both in the space S. The plurality of first electrode 13 and the plurality of second electrode 22 are parallel. In the embodiment, preferably, the number of the plurality of first electrode 13 is two, and the number of the plurality of second electrodes 22 is four. One of the plurality of first electrodes 13 is placed in the first space, and this one of the plurality of first electrode 13 is corresponded to two of the plurality of second electrode. The other one of the plurality of first electrodes 13 is placed in the second space, and this one of the plurality of first electrodes 13 is also corresponded to two of the second electrodes. Therefore, a plurality of sensing capacity such as four capacities is then formed.

In addition, the plurality of first electrode 13 and the plurality of second electrode 22 is symmetrical, which provide the measurement of the front normal stress or the side shear stress.

In the other embodiment, the plurality of first electrodes 13 is electrode layers, and the plurality of second electrode 22 is double conductive wire layers.

Therefore, the capacitive pressure sensor 1 provided by the embodiment can provide the two-dimensional sensing function. When the front normal stress or the side shear stress is applied, the gap between the plurality of first electrode 13 and the plurality of second electrode 22 will be changed. The capacitance value of the sensing capacity formed by the plurality of first electrode 13 and the plurality of second electrode 22 will also be changed. The change of pressure can be known through measuring the capacitance value.

That is to say, when the force is applied on the capacitive pressure sensor 1, the stress layer 11 and the convex part 111 will be deformed due to the force. The capacitance value of the sensing capacity formed by the plurality of first electrode 13 and the plurality of second electrode 22 will be changed to sense the applied force. In addition, the capacitive pressure sensor 1 provided by the embodiment can convert the contact force into the normal stress or the shear stress. Under the normal stress, the capacitance value of the sensing capacity formed by the plurality of first electrode 13 and the plurality of second electrode 22 will be changed evenly. While under the shear stress, the capacitance value of the sensing capacity formed by the plurality of first electrode 13 and the plurality of second electrode 22 will be changed unevenly. Thus, it will be able to know which direction has larger change of capacitance by comparing the values, and calculate the direction and strength of applied force.

In addition, in order to sense the change of shear stress precisely, the stress layer 11 provided by this embodiment includes a convex part 111 and a support pillar 123 of the cover 12. The sensing of the shear stress in each direction can be achieved via the symmetry of each sensing capacity formed by the plurality of first electrode 13 and the plurality of second electrode 22.

Figure 4:
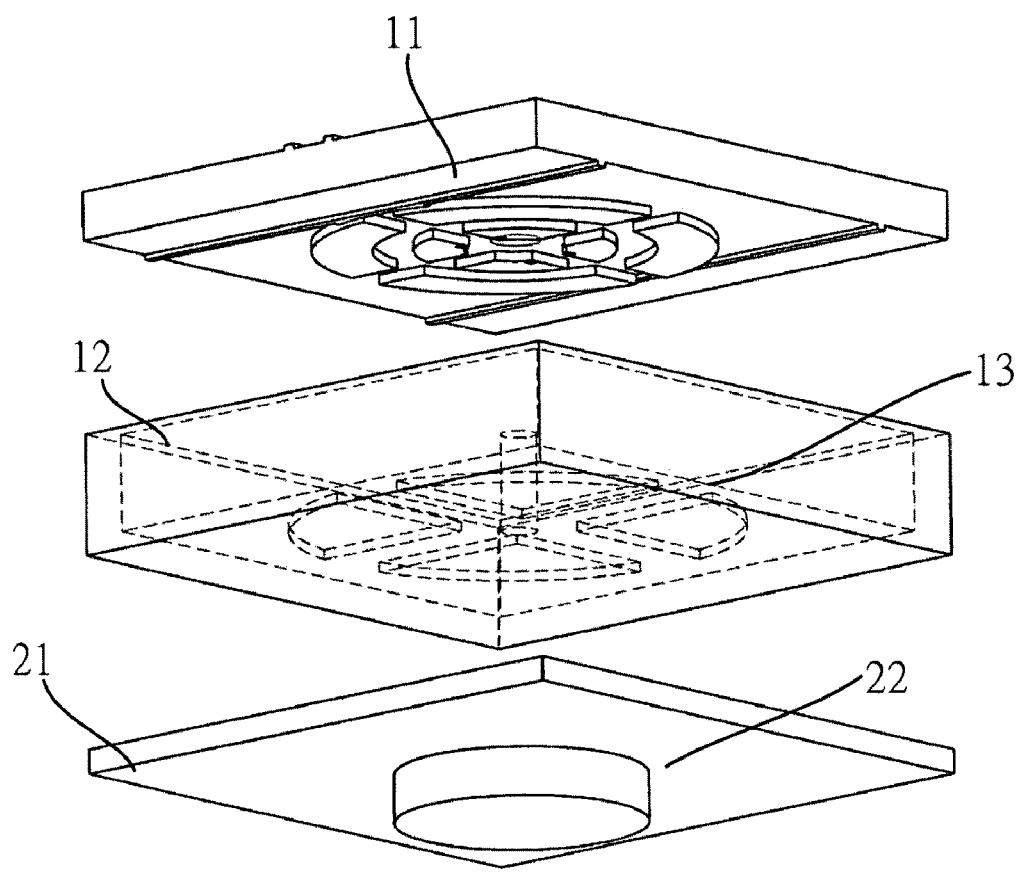
FIG. 4 schematically shows the exploded diagram of capacitive pressure sensor for a preferred embodiment of the invention.

FIG. 4 schematically shows the exploded diagram of capacitive pressure sensor for a preferred embodiment of the invention.

Figure 5:
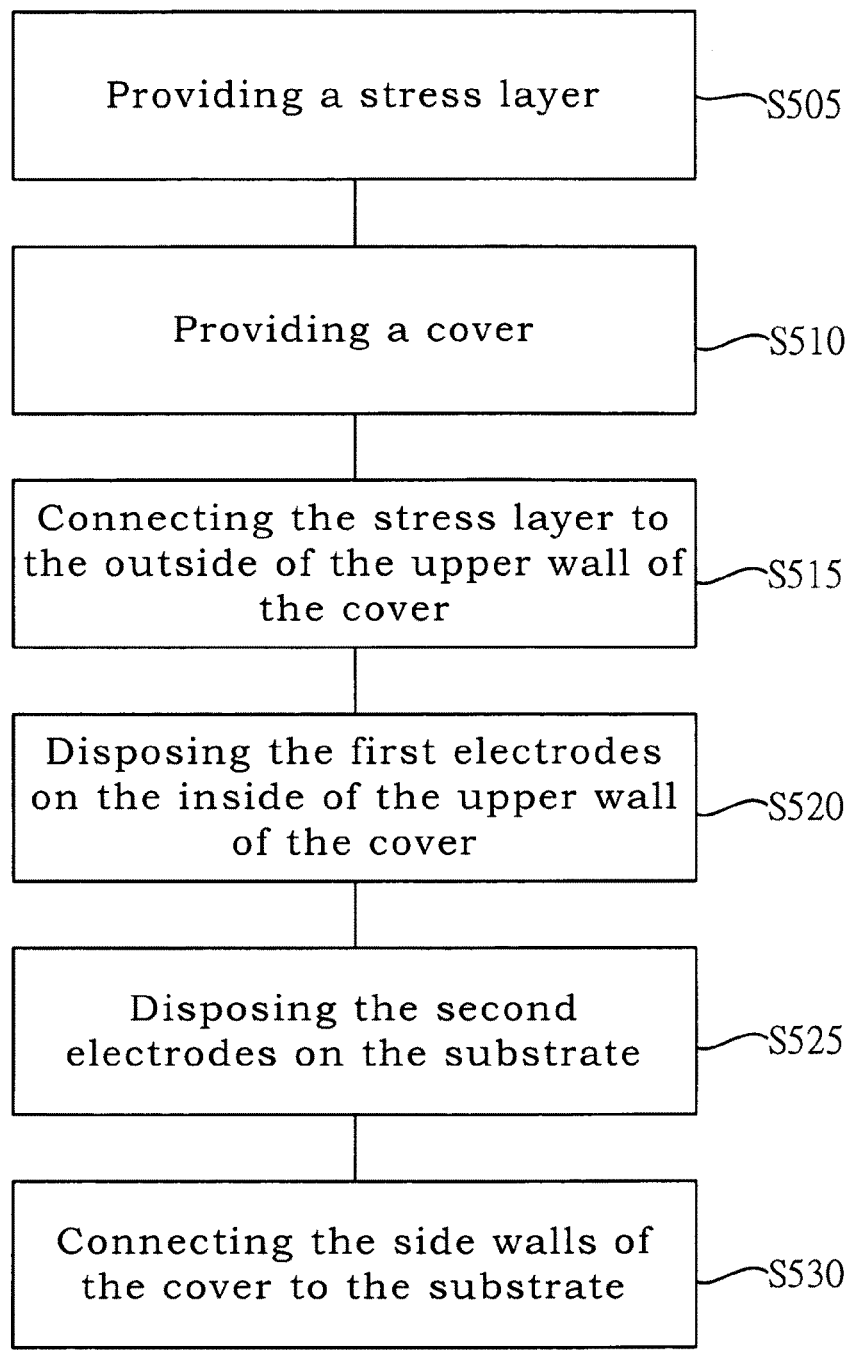
FIG. 5 schematically shows the manufacturing flow diagram of capacitive pressure sensor for a preferred embodiment of the invention.

FIG. 5 schematically shows the manufacturing flow diagram of capacitive pressure sensor for a preferred embodiment of the invention. Please also refer to FIG. 1 for the description of FIG. 5.

In the step S505 of FIG. 5, a stress layer 11 with the convex part 111 is provided. In the step S510, a cover 12 is provided. In the step S515, the stress layer 11 is connected to the outside of the upper wall 121 of the cover 12. In the step S520, the plurality of first electrode 13 is disposed on the inside of the upper wall 121 of the cover 12. In the embodiment, the first plurality of electrode 13 is disposed on the inside of the upper wall 121 of the cover 12 by the sputtering or vapor deposition. In the step S525, the second electrodes 22 are disposed on the substrate 21. The plurality of second electrode 22 is disposed on the substrate 21 by the etching process. Finally, in the step S530, the side walls 122 of the cover 12 are connected to the substrate 21, so that one of the plurality of first electrode 13 corresponds to at least one of the plurality of second electrode 22 in order to form a plurality of sensing capacity.

In addition, the capacitive pressure sensor provided by this embodiment can be implemented to a plurality of devices. For example, in the manufacturing of the sensor array, a single capacitive pressure sensor can be used as the module to form a N×M pressure sensor array.

Summarizing the above description, the capacitive pressure sensor 1 provided by a preferred embodiment of the invention uses the processing and adhering technology of polydimethyl siloxane and the micro-etching technology of polyimide to greatly reduce the complexity of process, and effectively improve the throughput of process and assembly.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A capacitive pressure sensor, comprising:
a cover having an upper wall a plurality of side wall;
a plurality of first electrode disposed on the inside of the upper wall of the cover;
a substrate connected to the side walls to form a space; and
a plurality of second electrode disposed on the substrate, the plurality of first electrode and the plurality of second electrode being both in the space, and one of the plurality of first electrode corresponding to one of the plurality of second electrode in order to form a plurality of sensing capacity; wherein a material for the cover, the plurality of first electrode and the plurality of substrate being a flexible polymeric material.

2. The apparatus according to claim 1, further comprising a stress layer, wherein the stress layer being connected to the outside of the upper wall of the cover.

3. The apparatus according to claim 2, wherein the stress layer comprises a convex part, which makes the capacitive pressure sensor to accept the front normal stress and the side shear stress.

4. The apparatus according to claim 2, wherein the material of the stress layer comprises flexible polymeric material.

5. The apparatus according to claim 2, wherein the material of the stress layer comprises polydimethyl siloxane.

6. The apparatus according to claim 1, wherein the plurality of first electrode and the plurality of second electrode are parallel.

7. The apparatus according to claim 1, wherein the plurality of first electrode and the plurality of second electrode are symmetrical which provides the measurement of the front normal stress and the side shear stress.

8. The apparatus according to claim 1, wherein the cover comprises a support pillar, which connects the substrate, and divides the space into a first space and a second space.

9. The apparatus according to claim 8, wherein the support pillar supports the upper wall of the cover in order to measure the front normal stress and the side shear stress.

10. The apparatus according to claim 1, wherein the material of the cover comprises polydimethyl siloxane.

11. The apparatus according to claim 1, wherein the material of the substrate comprises polyimide.

12. A method for fabricating the capacitive pressure sensor, comprising:
    providing a cover having an upper wall and a plurality of side wall;
    disposing a plurality of first electrode on the inside of the upper wall of the cover;
    disposing a plurality of second electrode on the substrate; and
    connecting a plurality of side wall of the cover and the substrate, so that one of the comprising the plurality of first electrode corresponding to one of the plurality of second electrode in order to form a plurality of sensing capacity; wherein the material of the cover, the plurality of first electrode and the substrate being a flexible polymeric material.

13. The method according to claim 12, further comprising:
    providing a stress layer; and
    connecting the stress layer to an outside of the upper wall of the cover.

14. The method according to claim 13, wherein the stress layer comprises a convex part, which makes the capacitive pressure sensor to accept the front normal stress and the side shear stress.

15. The method according to claim 13, wherein the material of the stress layer comprises polydimethyl siloxane.

16. The method according to claim 12, wherein the plurality of first electrode comprises disposed on the inside of the upper wall of the cover by the sputtering and a vapor deposition.

17. The method according to claim 12, wherein the plurality of second electrode comprises disposed on the substrate by the etching process.

18. The method according to claim 12, wherein the material of the cover comprises polydimethyl siloxane.

19. The method according to claim 12, wherein the material of the substrate comprises polyimide.

* * * * *